R. T. ST. JAMES.
MEANS FOR DETECTING IMPERFECTIONS IN MOTION PICTURE FILMS.
APPLICATION FILED NOV. 6, 1914.

1,190,204.

Patented July 4, 1916.

2 SHEETS—SHEET 1.

Inventor

Robert T. Saint James,

Witnesses

By Victor J. Evans

Attorney

R. T. ST. JAMES.
MEANS FOR DETECTING IMPERFECTIONS IN MOTION PICTURE FILMS.
APPLICATION FILED NOV. 6, 1914.

1,190,204.　　　　　　　　　　　　　　Patented July 4, 1916.
2 SHEETS—SHEET 2.

Witnesses　　　　　　　　　　　Inventor
　　　　　　　　　　　　Robert T. Saint James,
　　　　　　　　　　By Victor J. Evans
　　　　　　　　　　　　　　Attorney

UNITED STATES PATENT OFFICE.

ROBERT T. ST. JAMES, OF GREAT BARRINGTON, MASSACHUSETTS.

MEANS FOR DETECTING IMPERFECTIONS IN MOTION-PICTURE FILMS.

1,190,204.     Specification of Letters Patent.     Patented July 4, 1916.

Application filed November 6, 1914. Serial No. 870,677.

*To all whom it may concern:*

Be it known that I, ROBERT T. ST. JAMES, a citizen of the United States, residing at Great Barrington, in the county of Berkshire and State of Massachusetts, have invented new and useful Improvements in Means for Detecting Imperfections in Motion-Picture Films, of which the following is a specification.

An object of the invention is to provide a device for detecting imperfections in films, and in the use of which imperfections such as broken sprocket holes and the like can be detected during the rewinding operation of the film.

The invention contemplates, among other features, a means which is preferably automatically actuated to detect the imperfections of the film, and to this end there is provided an electrical circuit associated with oscillable members having parts thereof operating over the film and whereby, when a break is found in the film, said members will be oscillated to close the circuit and either stop the progress of the film during the rewinding operation or actuate a signal, thus giving notice to the operator that a break or imperfection has been found.

Figure 1:
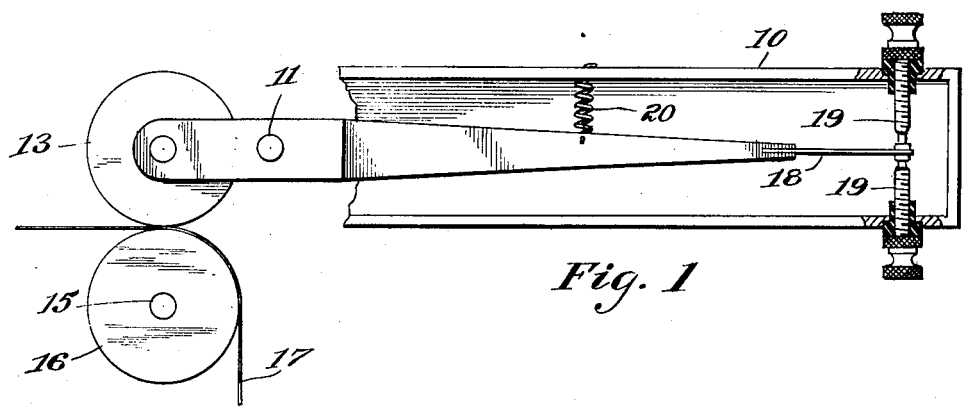
Figure 2:
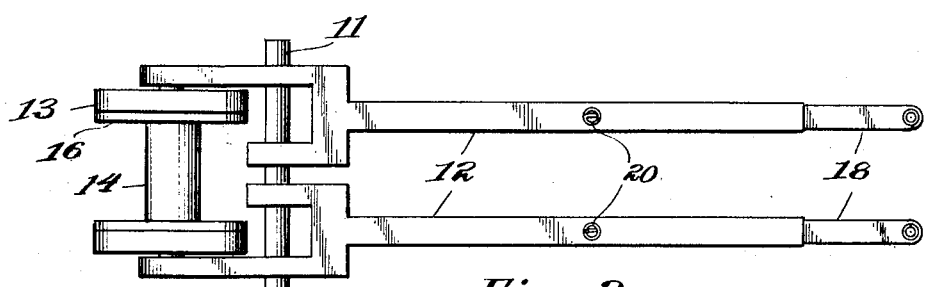
Figure 3:
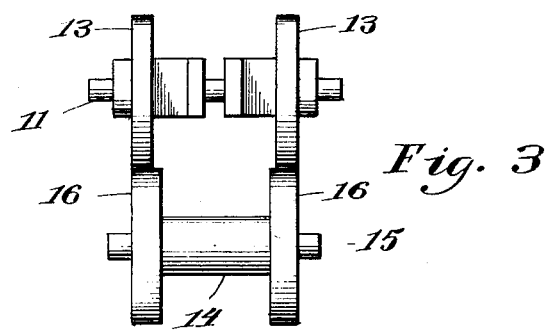
Figure 4:
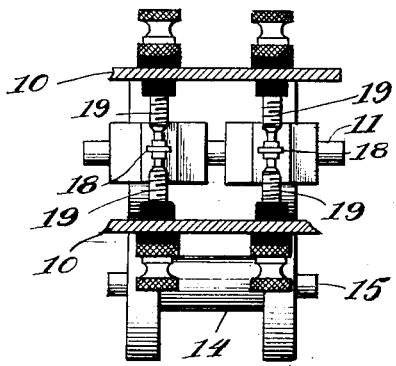
Figure 5:
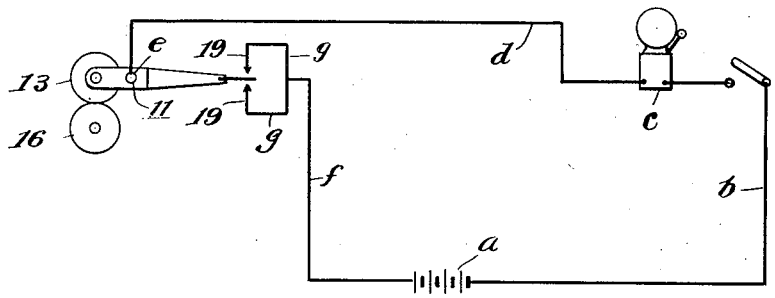
Figure 6:
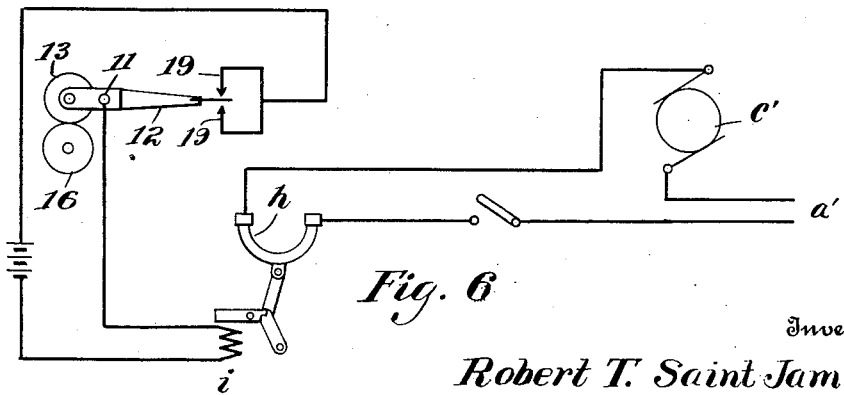

In the further disclosure of the invention reference is to be had to the accompanying drawings, constituting a part of this specification, in which similar characters of reference denote corresponding parts in all the views, and in which:

Figure 1 is a side elevation of the device, the casing being broken away; Fig. 2 is a plan view, the casing being removed; Fig. 3 is a view looking at one end of the device; Fig. 4 is a view looking at the other end of the device, the casing being broken away; Fig. 5 is a diagrammatic view of the electrical circuit; and Fig. 6 is a diagrammatic view of another form of electrical circuit.

Referring more particularly to the views, I disclose a casing 10 which supports a bearing 11 in the nature of a rod, said bearing having mounted to swing thereon a plurality of similar oscillable members 12, on the inner ends of which are supported suitable rollers 13 held in superposed relation to a spool 14 mounted to rotate on a bearing 15, said spool having enlarged disk-like flanges 16 which lie in the vertical planes of the rollers 13, with a film 17 adapted to pass between the rollers 13 and flanges 16 of the spool 14 as the film is being rewound from the usual secondary to the primary reel.

The outer or free ends of the oscillable members 12 have suitable contact plates 18 projecting therefrom and which lie between suitable adjustable contact points 19, each of said members 12 having connection with a spring 20 secured in the casing and which tends to hold the rollers 13 in engagement with the film and bear down thereon, said oscillable members when the the rollers are so arranged having the contact plates 18 lying between the contact points and not touching the same.

In the diagrammatic view there is shown a source of electric energy such as a battery, indicated by the letter $a$ and which, by a suitable wire $b$, is connected with a bell or other signal $c$, said bell having connection by a wire $d$ with a collar $e$ connected with the bearing 11, said bearing being insulated from the contact points 19 in any suitable manner, with the contact points also relatively insulated. A wire $f$ has suitable branches $g$ connecting with the contact points 19 and thus it will be seen that the circuit will be broken when the contact plates 18 lie between the contact points and do not touch the same.

As the film passes between the rollers and the spool it will be apparent that the sprocket holes will pass between the rollers and the spool and if the film should be broken or torn at one of the sprocket holes or some other imperfection occur in the film, the members 12 will be oscillated when the imperfection in the film passes between the rollers and spool, thus causing the contact plates 18 to engage with the contact points 19, thereby closing the circuit and sounding the alarm or signal $c$.

With a device of the character described it is only necessary for the operator to arrange the film to pass between the rollers and spools and then continue the rewinding operation until such time when the signal is sounded, giving notice to the operator that there is an imperfection in the film. The operator now stops the rewinding operation and can then readily repair the imperfection and then continue rewinding the film.

In Fig. 6 I show a modified form of electric connection in which use is made of a motor $c'$ which, by a belt or other suitable connecting means (not shown) can be connected with the rewinding mechanism to operate the same, said motor being in communication with a suitable source of electric energy $a'$, such as a series of batteries or some other electrical energy. The motor is suitably connected with a circuit breaker $h$ and a magnetic coil $i$ is arranged in juxtaposition to the circuit breaker and suitably connected with the oscillating members 12 and the contact points 19.

It will now be readily seen that when the members 12 are oscillated to result in engagement of the contact plates 18 with the contact points 19, the circuit to the magnetic coil $i$ will be closed, thus energizing the magnetic coil and resulting in the operation of the circuit breaker $h$ and which, breaking the circuit of the motor, will cause the motor to stop, thus stopping the rewinding operation of the film so that the operator can repair the imperfection in the film which resulted in the operation of the oscillable members, thus discontinuing the rotation of the motor, as mentioned.

It will be clearly seen that the device described can be accurately adjusted to effectively accomplish the desired result and that the device will be automatic in its operation and that it will readily give notice to the operator that there is an imperfection in the film as the film is being passed through the device between the rollers and spool.

Having thus described my invention, I claim:

In a device of the class described, a pair of oscillatory arms each having resilient fingers forming a contact, a pivot common to said arms for supporting the same, film engaging rollers journaled upon said arms, contact points arranged opposite each other and having the resilient fingers playing between the same, a normally open electric circuit connected with the contact points and with the arms and closed upon the engagement of the resilient fingers with either of said contact points arranged opposite each other, and means acting upon the arms to hold the same in positive engagement with the film, and effective on a break in the film or an imperfection therein, the said arms being formed with duplex bearings for the pivot.

In testimony whereof I affix my signature in presence of two witnesses.

ROBERT T. ST. JAMES.

Witnesses:
PHILIP BROWN,
JOSEPH H. MALONEY.